Aug. 5, 1947. W. G. HOELSCHER 2,425,281
LUBRICATION OF MACHINE TOOLS
Filed Sept. 10, 1943 3 Sheets-Sheet 1

INVENTOR.
William G. Hoelscher
BY Wood, Arey, Herron & Evans
Attorneys.

Aug. 5, 1947.   W. G. HOELSCHER   2,425,281
LUBRICATION OF MACHINE TOOLS
Filed Sept. 10, 1943   3 Sheets-Sheet 2
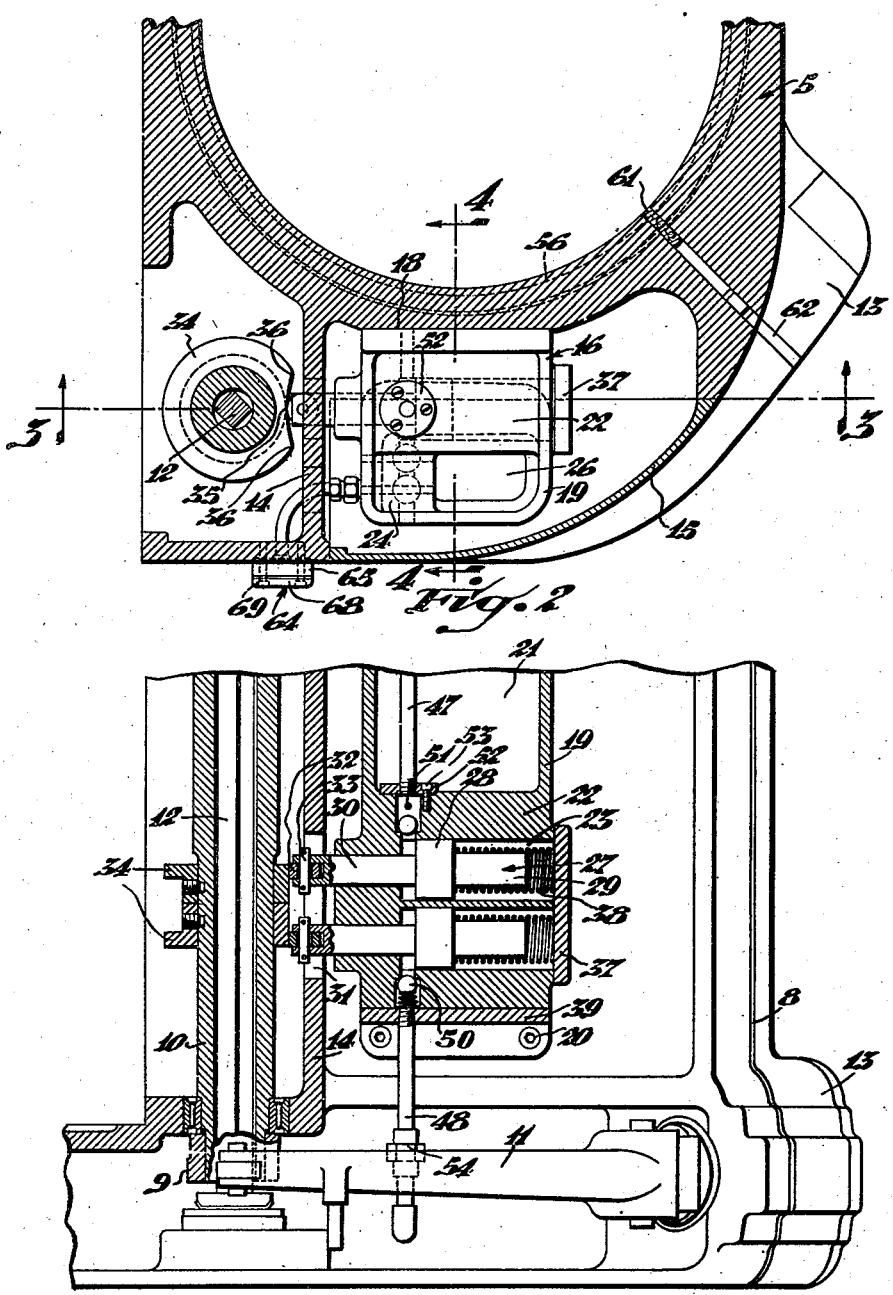
INVENTOR.
William G. Hoelscher
BY Wood, Arey, Herron & Evans
Attorneys

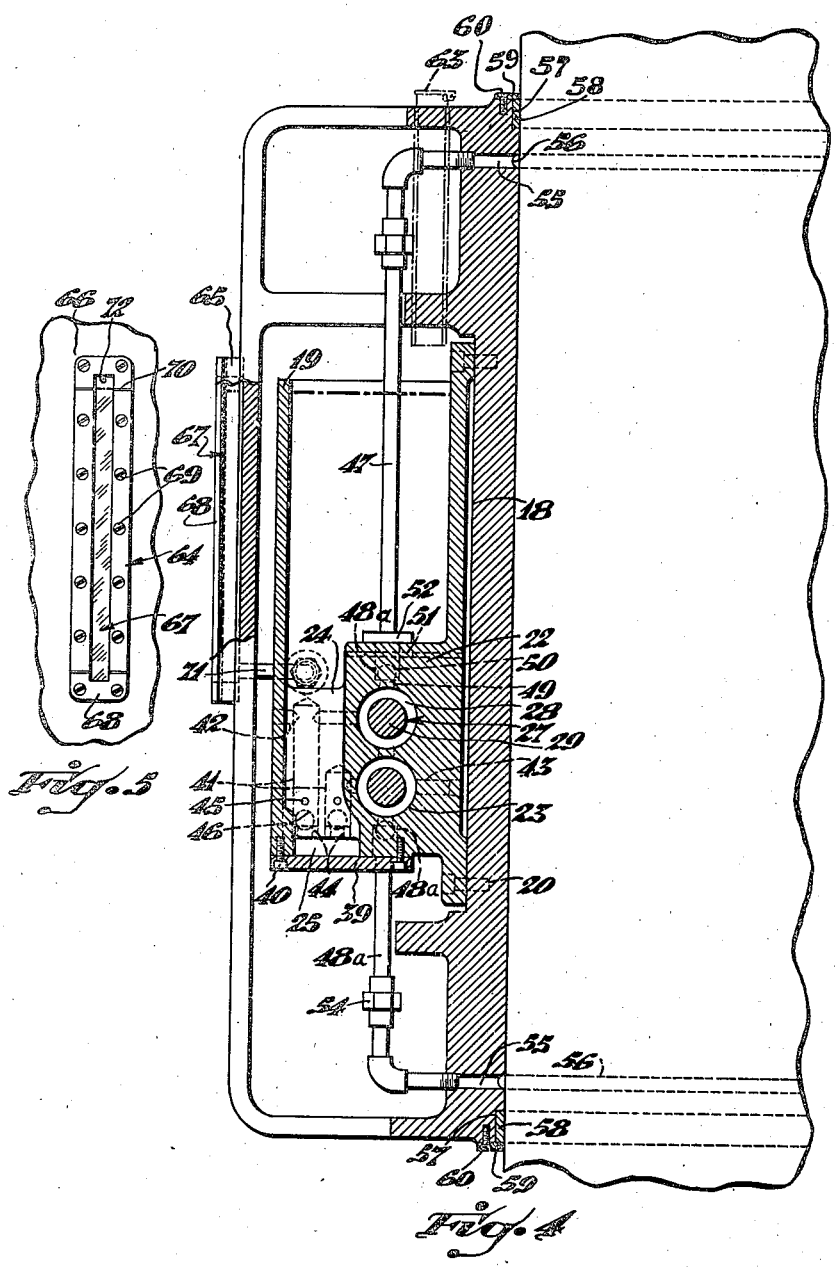

Patented Aug. 5, 1947

2,425,281

UNITED STATES PATENT OFFICE 2,425,281

LUBRICATION OF MACHINE TOOLS

William G. Hoelscher, Cincinnati, Ohio, assignor to The American Tool Works Company, Cincinnati, Ohio, a corporation of Ohio Application September 10, 1943, Serial No. 501,826

6 Claims. (Cl. 184—6)

This invention relates to lubricating apparatus for machine tools. The invention is disclosed in the environment of a radial drill as a system for maintaining a film of oil between translating surfaces thereof such as the column of the drill and the arm which may be raised and lowered on it. The arm carrying the drill head and driving mechanism is a very heavy unit and embraces the column in a sleeve which is snug fitting in order that the machine may have the desired rigidity. A power driven mechanism having a shiftable lever is provided for raising the arm upon the column. At various times throughout the working day the arm is raised or lowered as the case may be to adjust the drill head to the height desired over the work.

Heretofore it has been conventional to apply oil to the column at opposite ends of the arm sleeve either by means of a brush or can. Lubrication in this manner, however, has been unsatisfactory; it is dependent upon the attention of the operator and frequently is neglected, and still more important, the leading edge of the sleeve, depending upon whether the arm is being raised or lowered, wipes the oil from the column surface, with the result that a limited amount of lubricant at best finds its way between the mating surfaces.

Conditions similar to these found in a radial drill are present in machine tools of various types wherein the unit bearing pressures are so heavy that acute wear is encountered unless positive lubrication adequately is maintained, yet wherein the operation of the members occurs at relatively infrequent intervals so that a more expensive positive pump system of lubrication is not justified. The principal objective of the present invention has been to provide a simple lubrication apparatus which will, reliably, furnish and maintain a supply of oil to meet such requirements.

Briefly, this invention contemplates a system comprising a fluid chamber connected to deliver fluid to the arm sleeve, a plunger which is urged or biased to expel oil from the chamber to the sleeve and means which is operable in unison with the control lever of the power driven translating mechanism for resetting the plunger and replenishing the supply of oil maintained within the fluid chamber each time the translating mechanism is operated. In this manner oil tends to be discharged continuously from the fluid chamber to the working members, the pressure of the supply being governed by the degree to which the plunger is biased. Each time that the translating mechanism is rendered effective to move the working members with respect to one another the supply of lubricant within the chamber is replenished.

The invention further contemplates a structure in which lubricant channels, pressure fed from the fluid chamber, are provided adjacent the edges of the translating member whereby as it moves in either direction of rotation a film of oil is maintained throughout its length, that is, over the entire mating surfaces.

In the preferred embodiment of the invention fluid chambers are connected individually with these channels to insure that each receives its full share of lubricant; otherwise, if the conditions of confinement in the channels are not equal, a metering system may be necessary to distribute lubricant from a single fluid chamber uniformly.

The system, as applied to a radial drill or the like, contemplates apparatus in which the control lever for rendering the power elevating mechanism effective moves a cam which in turn actuates the plunger in a direction against its bias, thereby causing oil to flow into it from a reservoir for replenishment of the supply under plunger pressure. When the plunger is released it exerts a yieldable pressure upon the lubricant in the delivery system whereby lubricant is delivered as needed to the working surfaces. This pressure on the lubricant is uniformly maintained except at such times as the plunger is operated, from the control lever, against its bias when the fluid chamber within which the plunger operates is being replenished with oil from the reservoir supply. In this manner the parts are kept well oiled however often the arm is raised or lowered throughout the working day.

From the foregoing principles of the present invention and from the following detailed description of a preferred embodiment of it those skilled in the art readily will comprehend the various modifications to which the invention is susceptible.

In the drawings:

Figure 2 is a horizontal sectional view taken through the sleeve end of the arm showing the lubricating apparatus in plan.

Figure 3 is a sectional elevation through the lubricating apparatus as taken on the line 3—3 of Figure 2.

Figure 4 is a sectional view taken on the line 4—4 of Figure 2.

Figure 5 is a front elevational view of the oil level sight glass.

Figure 1:
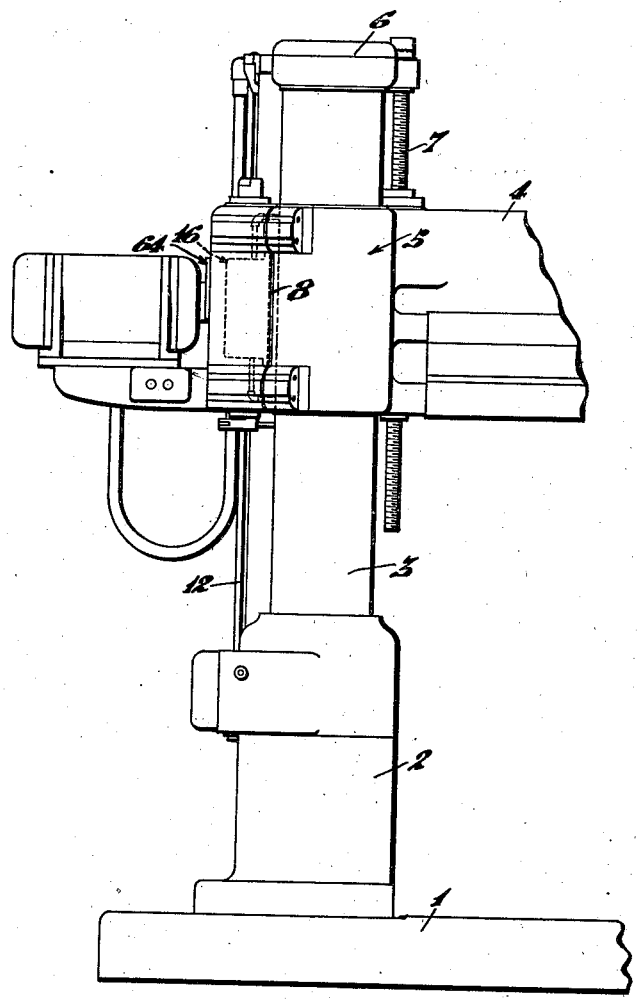
Figure 1 is a front elevation of a radial drill showing the column and arm thereof in the environs of the present lubricating apparatus.

The radial drill shown in the drawings comprises the usual base 1, stump 2 and column 3 extending upwardly from the stump. The arm 4, is translatable upon the column in up and down directions and is supported from it through a sleeve which is indicated generally at 5. Column 3 has a cap 6 at its upper end from which an elevating screw 7 is suspended.

The drill is equipped with mechanism for elevating the arm and clamping it upon the column in the usual manner. This structure is well recognized in the art and therefore is not shown in the drawings or described here in detail. It consists essentially of transmission gearing terminating in a nut which is traversed by the elevating screw 7 and which when rotated advances along the screw to carry the arm upwardly or downwardly. The transmission mechanism is controlled from a shiftable lever which usually is located at the drill head. The sleeve on the arm is split longitudinally along the line 8 whereby it is contractable, for clamping, through a cam 9 carried at the lower end of a shaft 10 extending vertically along the column. A lever 11 has one end riding on the cam while the opposite end is in connection with the ususal drawbolt by means of which the diameter of the sleeve is reduced. The power elevating mechanism control lever also controls clamping and unclamping of the arm as it is shifted toward and from its neutral position. The structure generally is representative of that embodied in various machines all characterized by mechanism in which a part thereof is shifted or rotated when the power driven mechanism is brought into operation.

It is also to be noted that, in the structure shown in the drawings, shaft 10 is hollow, and a square shaft 12 passes down through it but this square shaft extends down to the stump clamp and does not form any part of the present invention.

At the side of the column sleeve 5 opposite the arm bosses 13 are provided to receive the drawbolts in the usual manner and there is a web 14 extending outwardly in the plane of the arm which serves as a stiffener. A cover plate 15, suitably configurated to the contours of the structure, extends from the outer extremities of the web 14 to the forward portion of the arm and the lubrication apparatus of the present invention indicated generally at 16 is concealed within the cavity delineated by this cover.

Within the cover, a face 18 is provided on the sleeve and in the preferred embodiment the lubricator consists of a casting 19 which is fastened through the bolts 20 to this face. The casting includes an upper hollow portion 21 which constitutes a reservoir while the lower part of the block has a web 22 extending laterally across it which in turn is bored as at 23 to constitute fluid chambers. A web 24 also extends across the block at its lower portion and at right angles to the web 23 to provide for check valves which are described at a later point in the specification, but this web, it is to be noted, is spaced upwardly from the bottom of the unit as at 25 so that oil contained within the reservoir may flow down through the opening 26 and underneath the opening 25 to enter the fluid chambers after passing the check valves contained therein.

Each fluid chamber 23 slidably receives a plunger 27 which fits snugly within it. The plungers consist of piston portions 28, tail portions 29, at one side thereof within the chamber, and rod portions 30 at the other side extending respectively through suitable bores beyond the chamber and also through a clearance opening 31 in the web 14 toward sleeve 10. The forward portion of each rod 30 is slotted to receive a roller 32 which is rotatable on a pin 33, while the sleeve 10 carries cams 34 respectively presenting dips 35 and cam lobes 36 at either side thereof.

The fluid chambers 23 are closed by means of a cover plate 37, and compression springs 38, forming the means for biasing the plungers toward the cams 34, surround the tail portions 29 of the plungers, one end of each spring 38 pressing against the plunger piston 28 while the opposite end is buttressed by the cover plate 37. It may be seen, therefore, that the springs push the plungers toward the cams 34 and that the rotation of the sleeve 10 in either direction of rotation will cause the lobes 36 of the cams thereon to move the plungers against the springs. This movement may be termed resetting of the plungers while movement thereof in an opposite direction is accompanied by expulsion of lubricant to the column and the arm.

The bottom portion of the casting 19, which extends below the web 24 to provide the channelway 25, is closed by a cover plate 39 fastened in place by means of screws 40. Inlet bores 41 pass upwardly from the lower portion of the web 24, one for each fluid chamber. One cross bore, 42, passes from the outside of the casing through the longer of the inlet bores 41 into the upward fluid chamber 23, while another cross bore, 43, passes from the back side of the casting through the lower fluid chamber to interconnect it with the other vertical inlet bore. The usual plugs are provided at the outer extremities of cross bores 42 and 43 to prevent the escape of fluid and, at the lower portion of each of the vertical bores 41, a ball seat 44 is installed. Just above these seats cross pins 45 are located which limit the upward travel of balls 46 which rest on the seats.

The passage system just described constitutes the inlet passageway for each fluid chamber. When the plungers are moved by the cams the negative pressure within the cylinders causes the balls 46 to lift from their seats and permit oil to flow upwardly through the respective passages 41, 42 and 43 to the upper and the lower fluid chambers. As the balls 46 become reset the oil is trapped in the fluid chambers subject to discharge to the working elements of the machine.

The discharge system comprises conduits 47 and 48 which are individual to the respective fluid chambers. The upper and lower portions of the web 24 above and beneath the fluid chambers respectively are bored as at 48a. Bores 49 of smaller diameter pass therefrom into the fluid chambers with seats being provided through the difference of diameter between the bores. Balls 50 are located on these seats, the ball in the bore at the upper fluid chamber being limited as to its lift by means of a pin 51 which passes laterally through the bore. Just above this pin a ring 52 is bolted in a recess at the lower portion of the reservoir 21. This ring surrounds the bore 48a and is threaded to receive the upper conduit 47, the ring in turn being held in place by means of bolts or screws 53. The lower conduit 48 is threaded directly into a bore in the lower cover plate for communication with the outlet from the lower fluid chamber. Each outlet conduit contains unions 54 through which it may be assembled and disassembled and beyond these unions the upper and lower conduits respectively pass into threaded connection with bores 55 which pass through the sleeve and into communication with annular channel-ways 56 cut in the inner surface thereof. These channel-ways, it is to be noted, are located adjacent the upper and lower extremities of the sleeve and, when filled with oil under pressure from the delivery system just described, provide a film of lubricant at its extremities and therefore serve to maintain a film of lubricant over the entire area of the sleeve.

Whenever the arm is to be raised or lowered on the column, shaft 10 is rotated. The movement of this shaft is used as a means for replenishing the oil in the fluid chambers of the lubricating system and for simultaneously relieving the pressure exerted on the lubricant by the spring-actuated plungers when the arm is in movement. For this purpose cams 34 are so arranged upon shaft 10 as to push the plungers 27 against springs 38 whenever shaft 10 is moved to a position in which the power mechanism of the machine is rendered effective for raising or for lowering the arm. So long as the power mechanism is in operation the plungers are held in a retracted position by the cams 34 and, during this time, oil is drawn into the fluid chambers from the reservoir. However, when the shaft 10 next is moved and power operation of the arm upon the column is to be terminated, the cams 34 depart from the plungers and the plungers then are urged by the springs to exert pressure upon the replenished supplies of oil within the fluid chambers. Pressure in the lubricant delivery systems to the sleeve always is maintained except when the arm is actually in motion.

For the purpose of confining the lubricant within the sleeve over the area at which the sleeve engages the column, gland recesses 57 are cut in the upper and the lower edges of the sleeve to receive packing rings 58 which are made of oil resistant artificial rubber or similar oil resistant yieldable material. These rings in width are slightly greater than the depth of the annular recesses and therefore extend slightly beyond the extremities of the sleeve. Clamp rings 59 held by means of screws 60 at spaced intervals have their inner edges engaging the rings 58 and, therefore, as the screws 60 are tightened the rings 58 are expanded inwardly snugly to engage the column of the machine. This arrangement seals the peripheral opening of the sleeve. For the purpose of preventing the escape of lubricant through the slot 8 extending longitudinally thereof, a strip of similar material 61 is placed within the slot, its ends abutting the upper and lower sealing rings 58. This strip may be sufficiently wide to extend a substantial distance into the slot while the remainder of the distance, to the outer edge, may be filled in with a piece of plywood 62 or the like, for the purpose of buttressing the sealing strip 61 as well as for the purpose of preventing the entrance of dirt into the slot.

Oil is fed from the fluid chambers to the column and the sleeve in accordance with the need or as the lubricant is used up. If oil flows from a channelway at one end of the sleeve at a rate greater than that flowing from the channelway at the other end, then the plungers in the fluid chambers will occupy relatively different positions corresponding to the degree of exhaustion of the fluid chambers. However, as soon as the actuating cam is operated, or as soon as the elevating control apparatus is brought into operation, then both fluid chambers are restored to a fully charged condition.

The lubrication apparatus just described is concealed within the cavity delineated by the outer cover 15 and, therefore, is confined against the entrance of dirt and grit. For the purpose of introducing lubricant into the reservoir an oiling tube 63 or other suitable inlet preferably having a cap at its upper portion passes through the top part of the arm to deliver oil, which may be poured therein into the reservoir. At the outside of the arm a sight glass indicated generally at 64 is provided to indicate the level of oil maintained within the reservoir without removing outer cover 15.

This sight glass comprises a rectangular frame 65 which is fastened to a face 66. An oil sealing gasket is interposed between the face 66 and the frame. Over this frame a gasket and window assembly, indicated generally at 67, is mounted, comprising a pair of gaskets, of suitable oil-proof material, at opposite sides of a window pane which may be made of suitable transparent plastic material or glass, preferably the former. This gasket and window assembly is held to the frame 65 by a frame 68 which is fastened through screws 69. The window contains an oil level line 70 corresponding with the high level of oil in the reservoir. A wall of the reservoir 26 is bored at a point corresponding substantially to the low level of oil to be maintained therein and an inlet tube 71 is taken from this bore through the web 14, through the wall 66 of the arm and into the bottom of the sight glass, whereby oil is permitted to flow from the reservoir into the sight glass. A suitable vent opening 72 is provided at the upper portion of the sight glass to permit air to escape as the oil flows into the sight glass.

Having described my invention, I claim:

1. A lubricator for a machine tool having a power driven mechanism and a movable control lever for rendering said mechanism effective and ineffective, including a reservoir, a fluid chamber connected with said reservoir to derive fluid therefrom, a plunger slidable within said fluid chamber, a lubricant discharge duct from said chamber, spring means for urging said plunger in a direction to cause expulsion of fluid from said chamber through said discharge duct under the pressure of the spring means, and means for filling said fluid chamber with lubricant from said reservoir comprising a member connected with said control lever and positioned to push said plunger against said spring when said control member is moved to render said power driven mechanism effective and to depart from said plunger as said control member is moved to render said power driven mechanism ineffective, whereby said plunger is released to exert spring pressure on the lubricant in said chamber when the power driven mechanism is idle.

2. In a radial drill having a column, an arm having a sleeve embracing the column and being translatable thereon, a power driven mechanism for translating the arm upon said column, a control lever which is shiftable to render said power driven mechanism effective, said sleeve having annular passageways adjacent its respective ends at the inner surface thereof, gasket means carried by said sleeve endwisely beyond said recesses for providing seals between said endwise portions of said sleeve and column, means comprising a fluid chamber for holding a supply of oil, a plunger, a spring operating on said plunger for exerting pressure on said supply of oil, conduit means for conveying oil under such pressure from said fluid chamber to said annular passageways, and means operable in unison with shifting movement of said control lever to position for rendering said power driven mechanism effective for replenishing the supply of oil in said fluid chamber, including means for actuating said plunger against said spring to relieve the pressure on said supply of oil during translation of said arm.

3. In a radial drill having a column, an arm having a sleeve embracing the column and being translatable thereon, a power driven mechanism for translating the arm upon said column, a control lever which is shiftable to render said power driven mechanism effective, said sleeve having annular passageways adjacent its respective ends at the inner surface thereof, gasket means carried by said sleeve endwisely beyond said recesses for providing seals between said sleeve and column, means comprising a fluid chamber for holding a supply of oil, a plunger for exerting pressure on said supply of oil, conduit means for conveying oil under such pressure from said fluid chamber to said annular passageways, and means controlled by said control lever for replenishing the supply of oil in said fluid chamber, said means including a rotatable cam in connection with said control lever positioned to impart a sliding movement to said plunger when said control lever is shifted to position for rendering said power driven mechanism effective for translating said arm upon said column.

4. A radial drill having a column, an arm having a bore for embracing said column and being translatable thereon, a power driven mechanism for translating said arm upon said column and a control lever which is shiftable to render said power driven mechanism effective, said arm having a split extending longitudinal of said bore therein whereby said arm may be clamped to said column through contraction of said bore diameter, and said bore having annular recesses in its surface adjacent endwise portions thereof, sealing gaskets surrounding said column at the endwise portions of the bore in the arm, a compressible gasket installed in said longitudinal split, means for charging oil under yieldable pressure from a static supply to said annular recesses, and means operable in unison with shifting movement of said control lever to position for rendering said power driven mechanism effective for replenishing said supply and for coincidentally relieving the pressure exerted on the oil in said annular recesses.

5. A lubricating system for a radial drill, including a column, an arm having a sleeve embracing said column and translatable thereon, power mechanism for translating the arm upon the column, and a control lever for rendering said power mechanism effective and ineffective, comprising means delineating annular grooves upon said sleeve adjacent its opposite extremities, means for supplying oil under pressure to said annular grooves, and means operated from said control lever for relieving the pressure of the oil supplied to said annular grooves upon movement of said control lever to position for rendering said power driven mechanism effective.

6. A lubricating system for a radial drill, including a column, an arm having a sleeve embracing said column and translatable thereon, power mechanism for translating the arm upon the column, and a control lever for rendering said power mechanism effective and ineffective, comprising means delineating an annular groove at the column engaging face of said sleeve, a fluid chamber, a reservoir for supplying lubricant to said fluid chamber, a plunger slidable within said chamber, a conduit leading from said chamber to said annular groove, means for biasing said plunger in one direction for expulsion of lubricant thereby from said chamber to said conduit, and means for moving said plunger in an opposite direction for replenishment of lubricant in said chamber from said reservoir, including a connection from said control lever which is effective to operate said plunger upon movement of said control lever to position for rendering the power mechanism effective, whereby the pressure exerted by the plunger on the lubricant is relieved during translation of said arm upon said column.

WILLIAM G. HOELSCHER.

REFERENCES CITED

The following references are of record in the file of this patent:

UNITED STATES PATENTS

| Number | Name | Date |
|---|---|---|
| 2,079,700 | Archea | May 1, 1937 |
| 880,680 | Mathews | Mar. 3, 1908 |
| 1,000,791 | Erikson | Aug. 15, 1911 |
| 2,209,938 | Schauer | July 30, 1940 |